(12) United States Patent
Uchimura et al.

(10) Patent No.: US 10,090,015 B2
(45) Date of Patent: Oct. 2, 2018

(54) INFORMATION PROCESSING DEVICE, INFORMATION RECORDING MEDIUM, INFORMATION PROCESSING METHOD, AND PROGRAM

(71) Applicants: Sony Corporation, Tokyo (JP); Sony Pictures Entertainment Inc., Culver City, CA (US)

(72) Inventors: Kouichi Uchimura, Kanagawa (JP); Yoshikazu Takashima, Los Angeles, CA (US)

(73) Assignees: SONY CORPORATION, Tokyo (JP); SONY PICTURES ENTERTAINMENT INC., Culver City, CA (US)

( * ) Notice: Subject to any disclaimer, the term of this patent is extended or adjusted under 35 U.S.C. 154(b) by 0 days.

(21) Appl. No.: 14/559,391

(22) Filed: Dec. 3, 2014

(65) Prior Publication Data

US 2016/0064028 A1 Mar. 3, 2016

Related U.S. Application Data

(60) Provisional application No. 62/045,206, filed on Sep. 3, 2014.

(51) Int. Cl.
*G11B 20/12* (2006.01)
*G11B 7/007* (2006.01)
(Continued)

(52) U.S. Cl.
CPC ........ *G11B 20/1217* (2013.01); *G11B 7/0053* (2013.01); *G11B 7/0079* (2013.01);
(Continued)

(58) Field of Classification Search
None
See application file for complete search history.

(56) References Cited

U.S. PATENT DOCUMENTS

2001/0053114 A1* 12/2001 Miyake et al. ............ 369/47.55
2006/0133221 A1 6/2006 Suh et al.
(Continued)

FOREIGN PATENT DOCUMENTS

EP 1 134 738 A2 9/2001
JP 2002-279626 A 9/2002
(Continued)

OTHER PUBLICATIONS

International Search Report dated Sep. 29, 2015 in PCT/JP2015/069568 (with English Translation).
(Continued)

*Primary Examiner* — Brian Butcher
(74) *Attorney, Agent, or Firm* — Oblon, McClelland, Maier & Neustadt, L.L.P.

(57) ABSTRACT

An information processing device includes: a data processing unit which executes a reproduction process of recorded data of a disc, in which the data processing unit reads disc type information that is recorded on the disc, and ascertains a recorded data configuration of the disc based on the disc type information that is read, and executes data reading-out and reproduction processes according to a reading-out rate corresponding to the ascertained recorded data configuration.

19 Claims, 11 Drawing Sheets physical_disc_info = 0 : 50 GB
= 1 : 66.7 GB ZONING ABSENT
= 2 : 66.7 GB ZONING PRESENT
= 3 : 100 GB ZONING ABSENT
= 4 : 100 GB ZONING PRESENT

(51) Int. Cl.
  *G11B 7/005*  (2006.01)
  *G11B 20/10* (2006.01)
  G11B 7/0037  (2006.01)
  G11B 7/26    (2006.01)
  G11B 27/32   (2006.01)

(52) U.S. Cl.
  CPC .... *G11B 7/00736* (2013.01); *G11B 20/10527* (2013.01); *G11B 7/0037* (2013.01); *G11B 7/26* (2013.01); *G11B 27/329* (2013.01)

(56) References Cited

U.S. PATENT DOCUMENTS

2007/0274178 A1  11/2007  Kuroda
2011/0182156 A1  7/2011   Sasaki et al.

FOREIGN PATENT DOCUMENTS

| JP | 2008-84515 A   | 4/2008  |
| JP | 2010-211904 A  | 9/2010  |
| JP | 2010-250939 A  | 11/2010 |
| JP | 2011-70732 A   | 4/2011  |

OTHER PUBLICATIONS

Extended European Search Report dated Mar. 27, 2018 in European Patent Application No. 15838221.8 citing documents AA-AC and AO-AP therein, 7 pages.

* cited by examiner

FIG. 1

| | (a) DISC TOTAL CAPACITY & LTR ZONE RATIO (DISC TYPE & LTR RATIO) | (b) LOW READING-OUT RATE ZONE CAPACITY LTR SIZE (GB) | (c) HIGH READING-OUT RATE ZONE CAPACITY HTR SIZE (GB) | (d) LTR ZONE MAXIMUM READING-OUT RATE LTR MAX TS RATE (Mbps) | (e) HTR ZONE MAXIMUM READING-OUT RATE HTR MAX TS RATE (Mbps) |
|---|---|---|---|---|---|
| (1) | 50 GB (100%) [SINGLE ZONE TWO LAYER DISC] | 50 | 0 | 82 | - |
| (2) | 66.7 GB (100%) [SINGLE ZONE TWO LAYER DISC] | 66.7 | 0 | 108 | - |
| (3) | 66.7 GB (7.8%) [MULTI-ZONE TWO LAYER DISC] | 5.2 | 61.5 | 108 | 128 |
| (4) | 100 GB (100%) [SINGLE ZONE THREE LAYER DISC] | 100 | 0 | 108 | - |
| (5) | 100 GB (7.8%) [MULTI-ZONE THREE LAYER DISC] | 7.8 | 92.2 | 108 | 128 |

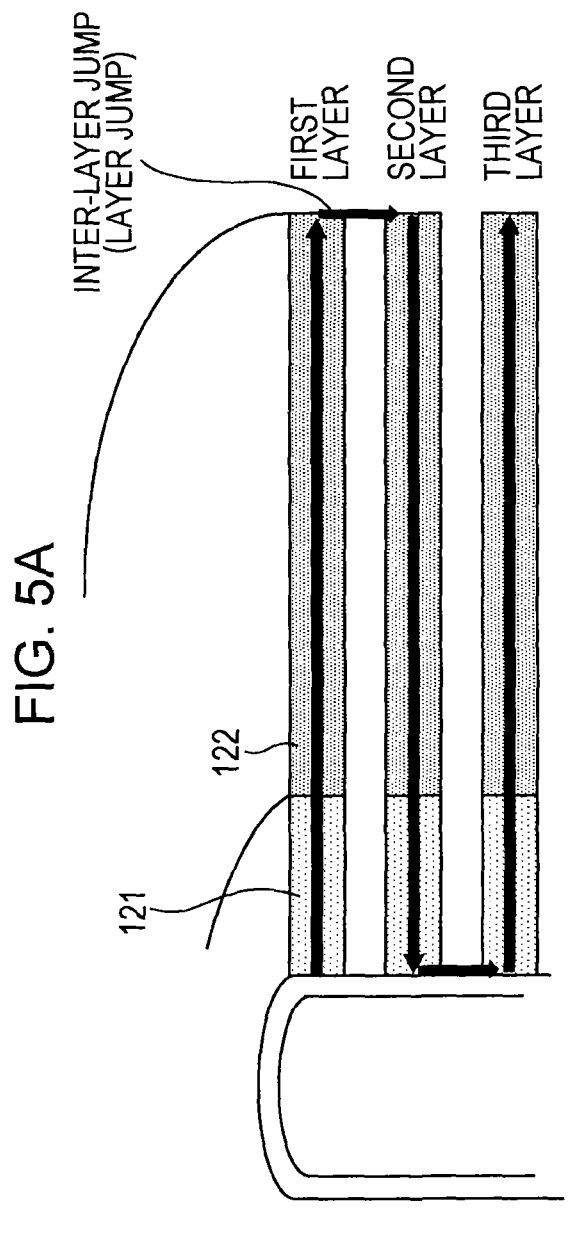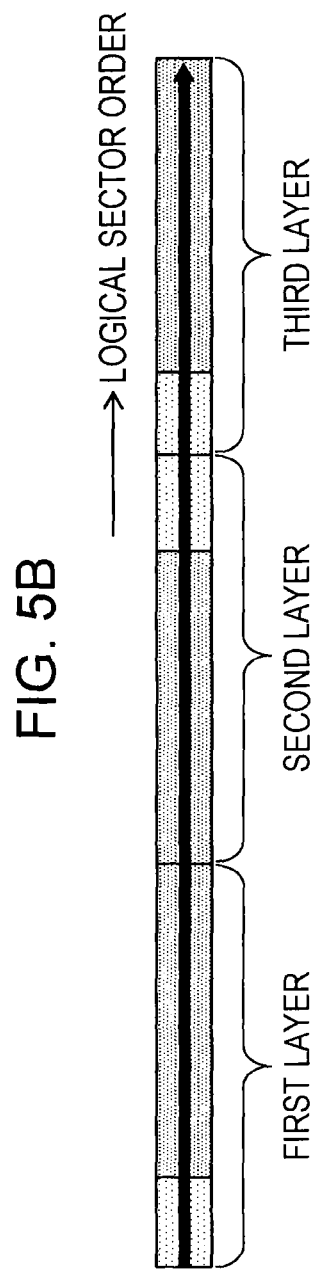

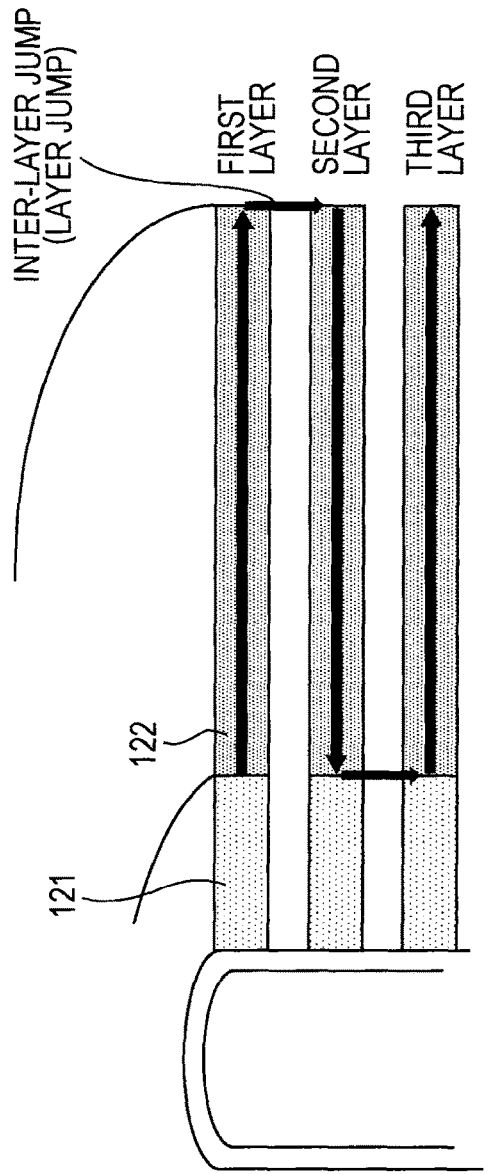
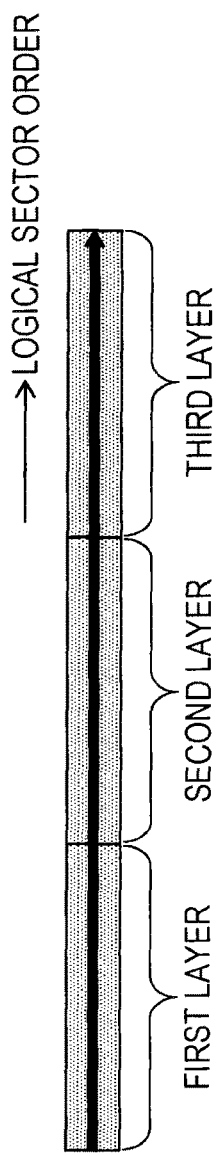

FIG. 8A physical_disc_info = 0 : 50 GB
= 1 : 66.7 GB ZONING ABSENT
= 2 : 66.7 GB ZONING PRESENT
= 3 : 100 GB ZONING ABSENT
= 4 : 100 GB ZONING PRESENT

FIG. 8B

| Syntax | Number of bits | Mnemonic |
|---|---|---|
| length | 32 | uimsbf |
| reserved | 1 | bslbf |
| initial_out_mode_preference | 1 | bslbf |
| SS_content_exist_flag | 1 | bslbf |
| physical_disc_info | 5 | bslbf |
| ... | | |

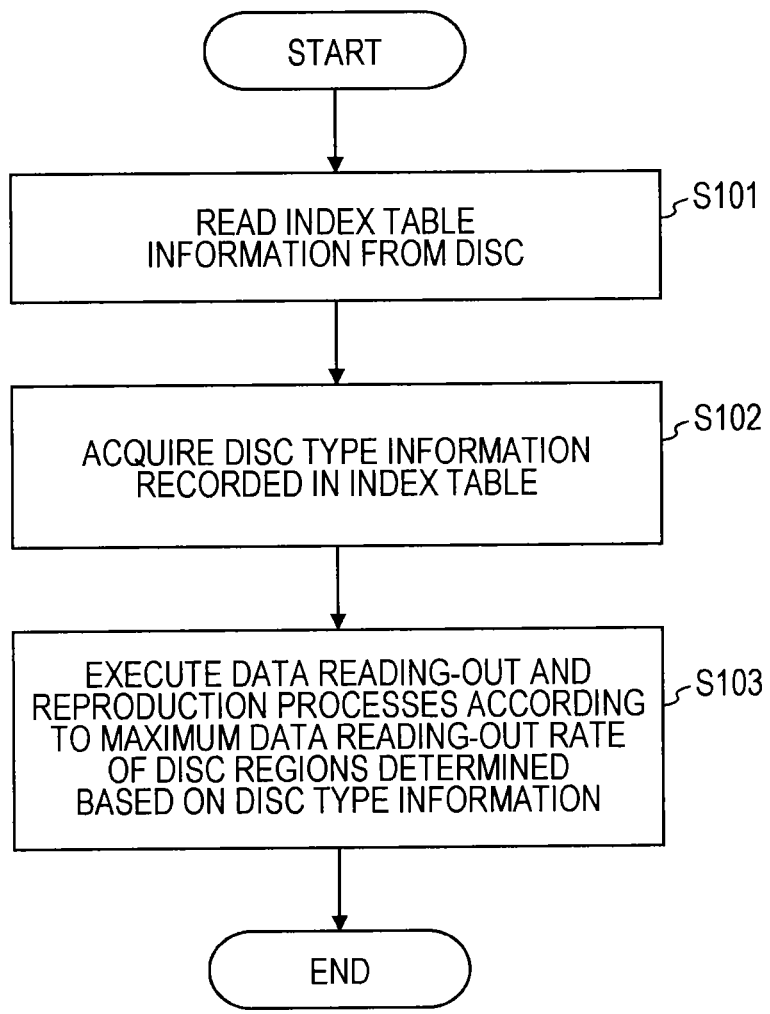

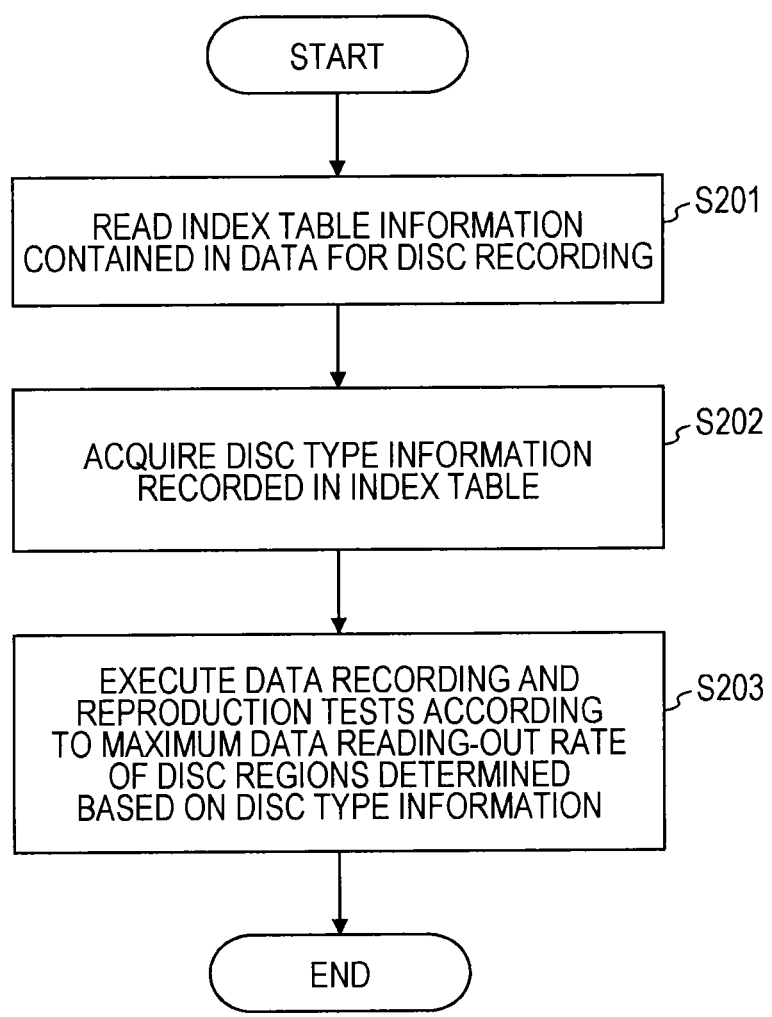

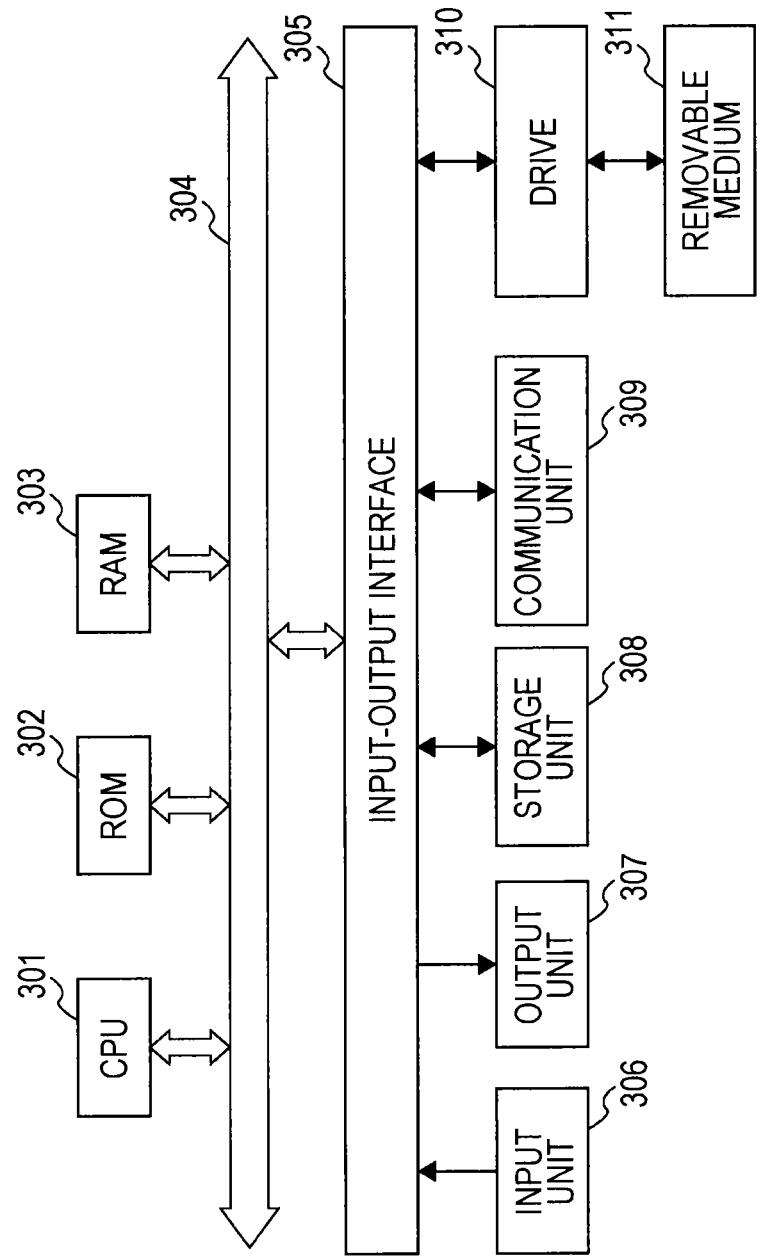

INFORMATION PROCESSING DEVICE, INFORMATION RECORDING MEDIUM, INFORMATION PROCESSING METHOD, AND PROGRAM

CROSS-REFERENCE TO RELATED APPLICATION

This application claims the benefit of priority of Provisional Application Ser. No. 62/045,206, filed Sep. 3, 2014, the entire contents of which is incorporated herein by reference.

BACKGROUND

The present disclosure relates to an information processing device, an information recording medium, an information processing method, and a program. More specifically, the present disclosure relates to an information processing device, an information recording medium, an information processing method, and a program, each of which accurately executes reproduction or recording of content using various types of discs that have different reading-out rate setting regions; or, accurately executes disc manufacture.

Digital Versatile Disc (DVD) and Blu-ray (registered trademark) Disc (BD) are often used as information recording media (media) on which various content such as movies and music is recorded.

On a BD-ROM, which is a medium on which content such as a movie is stored in advance, data such as audio and subtitles is recorded together with an High Definition (HD) image, which is a high definition image, for example.

Most BD-ROMs presently issued have mainly HD images, so-called high vision support 2K images recorded thereon; however, in the future, it is anticipated that the increases in image quality will proceed, and there will be an increase in media with 4K images, which are ultra high definition images (UHD), recorded thereon.

In comparison with 2K images, which are HD images, there is an increase in the amount of processing data per unit time in the ultra high definition image (UHD image) of a 4K image or the like. As a result, in relation to the disc such as the BD, it is necessary to increase the data recording density, and to increase the data reading-out rate.

Progress is presently being made in the standardization of the data recording mode of an ultra high definition image (a UHD image) in relation to BD at the Blu-ray (registered trademark) Disc Association (BDA), which is a standardization association.

At present, the strongest standard being drawn up is a proposition to use various different types of disc.

Specifically, the use of the following two different types of disc is proposed.

(A) A multi-zone set disc in which data recording regions of different reading-out rates are set in an outer circumferential region and an inner circumferential region of the disc (B) A single zone set disc in which a data recording region of a single reading-out rate is set in all regions of the disc and, in each of the two types, progress is being made in standardization in regard to using various types of disc with different total recording capacities.

However, when the use of a plurality of different types of disc is recognized as a standard, it is necessary to execute data recording and data reproduction corresponding to each type of disc, and also in the disc manufacture, different handling is necessary depending on which type of disc is manufactured.

For example, before reproducing the disc that is mounted in a reproduction device, it is necessary for the reproduction device to determine the type of the disc, ascertain the recording mode of the content that is recorded on the disc, and perform a reproduction process according to the recording mode.

Note that, Japanese Unexamined Patent Application Publication No. 2010-250939 is an example of the related art that describes an explanation relating to the reading-out rate from the disc and the reproduction process during data reproduction.

However, for example, there is no related art that describes a process such as data reproduction that uses a disc that has regions in which processing at different reading-out rates is necessary.

SUMMARY

It is desirable to provide an information processing device, an information recording medium, an information processing method, and a program, each of which is capable of, according to each type of disc, accurately executing a reproduction process of data or a recording process of data that is recorded on various different types of disc, or a disc manufacturing process.

According to an embodiment of the disclosure, there is provided an information processing device including a data processing unit which executes a reproduction process of recorded data of a disc, in which the data processing unit reads disc type information that is recorded on the disc, and ascertains a recorded data configuration of the disc based on the disc type information that is read, and executes data reading-out and reproduction processes according to a reading-out rate corresponding to the ascertained recorded data configuration.

According to an another embodiment of the disclosure, there is provided an information processing device including a data processing unit which executes data processing in a disc manufacturing process, in which the data processing unit reads disc type information that is included in recorded data in relation to a manufactured disc, and determines a data recording mode of the disc based on the read disc type information, and executes a data recording process in relation to the disc.

According to a still another embodiment of the disclosure, there is provided an information recording medium, in which, as recorded data, the information recording medium stores reproduction target data, and management data corresponding to the reproduction target data, in which the management data includes disc type information that includes zone setting information enables determination of whether a disc is a single zone disc formed of a single reading-out rate zone, or a multi-zone disc formed of a plurality of different reading-out rate zones, and in which the information recording medium makes it possible for a reproduction device that executes a reproduction process of data from the disc to refer to the disc type information and determine whether the disc is the single zone disc or the multi-zone disc.

According to a still another embodiment of the disclosure, there is provided an information processing method which is executed in an information processing device, in which the information processing device includes a data processing unit which executes a reproduction process of recorded data of a disc, and in which the data processing unit reads disc type information that is recorded on the disc, and ascertains a recorded data configuration of the disc based on the disc type information that is read, and executes data reading-out and reproduction processes according to a reading-out rate corresponding to the ascertained recorded data configuration.

According to a still another embodiment of the disclosure, there is provided an information processing method that is executed in an information processing device, in which the information processing device includes a data processing unit which executes data processing in a disc manufacturing process, and in which the data processing unit reads disc type information that is included in recorded data in relation to a manufactured disc, and determines a data recording mode of the disc based on the read disc type information, and executes a data recording process in relation to the disc.

According to a still another embodiment of the disclosure, there is provided a program which causes an information processing device to execute information processing, in which the information processing device includes a data processing unit which executes a reproduction process of recorded data of a disc, and in which the program causes the data processing unit to execute a process of reading disc type information that is recorded on the disc, and to ascertain a recorded data configuration of the disc based on the disc type information that is read, and to execute data reading-out and reproduction processes according to a reading-out rate corresponding to the ascertained recorded data configuration.

According to a still another embodiment of the disclosure, there is provided a program which causes an information processing device to execute information processing, in which the information processing device includes a data processing unit which executes data processing in a disc manufacturing process, and in which the program causes the data processing unit to execute a process of reading disc type information that is included in recorded data in relation to a manufactured disc, and to determine a data recording mode of the disc and to execute a data recording process in relation to the disc based on the read disc type information.

Note that, the program of the present disclosure is, for example, a program which can be provided using a storage medium or a communications medium which is provided in a computer-readable format in an information processing device or a computer system which is capable of executing a variety of program code. Processing which corresponds to a program on an information processing device or a computer system is realized by providing the program in a computer-readable format.

Other objects, characteristics and merits of the present disclosure will become clear due to a detailed description based on the examples and attached drawings of the present disclosure described later. Note that, the system in the present specification is a logical collection of configurations of a plurality of devices, and the devices of the configurations are not limited to being within the same housing.

According to the configuration of the present disclosure, it is possible to perform the correct reproduction process of data or the correct disc manufacturing process appropriate for the disc type, based on disc type information which is recorded data configuration information of the disc.

Specifically, for example, a reproduction device which executes data reproduction from a disc reads the disc type information that is recorded on the disc, ascertains the recorded data configuration of the disc based on the disc type information, and executes data reading-out and reproduction processes according to the reading-out rate corresponding to the ascertained recorded data configuration. The disc type information includes zone setting information that indicates whether the disc is a single zone disc formed of a single reading-out rate zone, or a multi-zone disc formed of a plurality of different reading-out rate zones, and the reproduction device performs data reading-out and reproduction by applying an algorithm corresponding to the zones.

According to the present configuration, it is possible to perform the correct reproduction process of data or the correct disc manufacturing process appropriate for the disc type, based on the disc type information which is recorded data configuration information of the disc.

Note that, the effects disclosed in the present specification are merely examples, embodiments are not to be limited thereto and additional effects may be present.

BRIEF DESCRIPTION OF THE DRAWINGS

FIG. 1 is a diagram illustrating a configuration example of discs for which standardization is in progress.

FIGS. 5A and 5B are diagrams illustrating a recording configuration and an example of a reproduction process of data using a disc with a three-layer structure.

FIGS. 6A and 6B are diagrams illustrating a recording configuration and an example of a reproduction process of data using a disc with a three-layer structure.

FIGS. 8A and 8B are diagrams illustrating a configuration example of data of an index table, which is recorded data in an index file that is recorded on an information recording medium (a disc) of the present disclosure.

FIG. 9 is a diagram illustrating a flowchart that shows the sequence of processes executed by an information processing device (a reproduction device) that reproduces the content that is recorded on the disc.

FIG. 10 is a diagram illustrating a flowchart that shows the sequence of processes executed in a disc manufacturing device.

FIG. 11 is a diagram illustrating a configuration example of hardware of an information processing device which can be applied as a reproduction device, a recording device, or an information recording medium manufacturing device of the disc.

DETAILED DESCRIPTION OF EMBODIMENTS

Figure 2A:
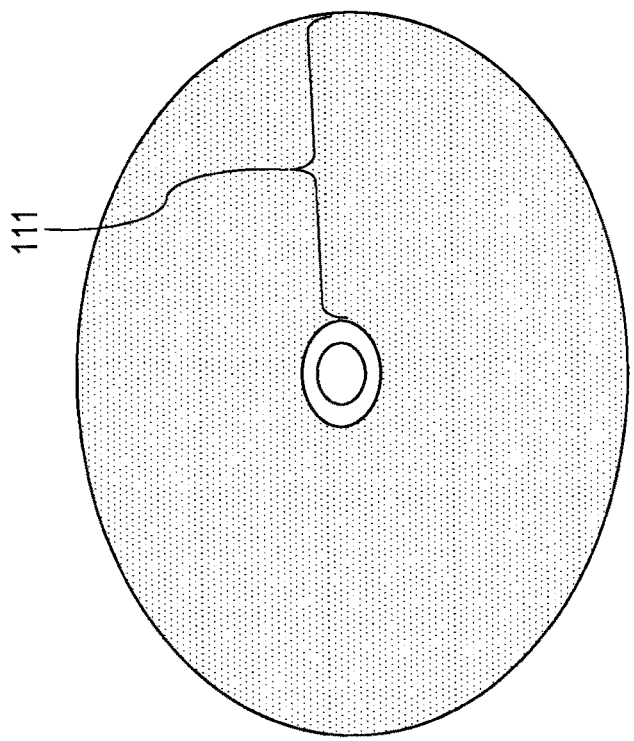
FIGS. 2A and 2B are diagrams illustrating examples of a single zone disc formed of only a low reading-out rate zone (LTR zone), and a multi-zone disc which has a low reading-out rate zone (LTR zone) and a high reading-out rate zone (HTR zone).

Hereinafter, an information processing device, an information recording medium, an information processing method, and a program of the present disclosure will be described in detail with reference to the drawings. Note that, the description will be given according to the following items.

1. Configuration Example of Disc with Support for Ultra High Definition (UHD) Images 2. Examples of Recorded Data and Reproduction Process of Disc 3. Examples of Data Recording Configuration and Reproduction Process of Disc with Multi-Layer (Layer) Structure 4. Example in which Disc Type Information Indicating Disc Configuration of Disc is Recorded 5. Configuration Example of Information Processing Device 6. Summary of Configuration of Present Disclosure

[1. Configuration Example of Disc with Support for Ultra High Definition (UHD) Images]

First, description will be given of the configuration example of a disc with support for Ultra High Definition (UHD) Images.

As described earlier, progress is presently being made in the standardization of the data recording mode of an ultra high definition image (a UHD image) of Blu-ray (registered trademark) Disc (BD) at the Blu-ray (registered trademark) Disc Association (BDA).

At present, the strongest standard being drawn up is a proposition to use various different types of disc.

Specifically, the strongest proposition is to use the following two different types of disc.

(A) A multi-zone set disc in which data recording regions of different reading-out rates are set in an outer circumferential region and an inner circumferential region of the disc (B) A single zone set disc in which data recording regions of a single reading-out rate are set in all regions of the disc Description will be given of a configuration example of discs for which standardization is in progress, with reference to FIG. 1.

FIG. 1 is a diagram illustrating a configuration example of five types of disc (1) to (5) which are gaining recognition as standards.

For each of the five types (1) to (5), the following data of (a) to (e) is illustrated.

(a) Disc total capacity and Low Reading-out Rate (LTR) zone ratio (Disc Type & LTR ratio)

(b) Low reading-out rate zone capacity (LTR size) (GB)

(c) High reading-out rate zone capacity (HTR size) (GB)

(d) LTR zone maximum reading-out rate (LTR max TS Rate) (Mbps)

(e) High Reading-out Rate (HTR) zone maximum reading-out rate (HTR max TS Rate) (Mbps)

Note that, the Low Reading-out Rate (LTR) zone is a region which is set on a portion or the entirety of a data recording surface of the disc, and is a disc region (a zone) in which data reading-out is performed at a relatively low reading-out rate.

The High Reading-out Rate (HTR) zone is a region which is set on a portion or the entirety of the data recording surface of the disc, and is a disc region (a zone) in which data reading-out is performed at a relatively high reading-out rate.

As illustrated in (d) and (e) of FIG. 1, the maximum reading-out rate in the LTR zone is 82 Mbps or 108 Mbps.

The maximum reading-out rate in the HTR zone is 128 Mbps.

Note that, the discs (1) to (5) all rotate at a rotational speed of approximately 5000 rpm during recording or reproduction of the data.

Disc (1) is a disc with the following configuration.

(a) Single zone two layer disc in which disc total capacity=50 GB, and low reading-out rate (LTR) zone ratio=100%

(b) Low reading-out rate zone capacity (LTR size) (GB)= 50 GB (c) High reading-out rate zone capacity (HTR size)=0 GB (d) Low reading-out rate (LTR) zone maximum reading-out rate (LTR max TS Rate)=82 Mbps Disc (2) is a disc with the following configuration.

(a) Single zone two layer disc in which disc total capacity=66.7 GB, and low reading-out rate (LTR) zone ratio=100%

(b) Low reading-out rate zone capacity (LTR size) (GB)= 66.7 GB (c) High reading-out rate zone capacity (HTR size)=0 GB (d) Low reading-out rate (LTR) zone maximum reading-out rate (LTR max TS Rate)=108 Mbps Disc (3) is a disc with the following configuration.

(a) Multi-zone two layer disc in which disc total capacity=66.7 GB, and low reading-out rate (LTR) zone ratio=7.8%

(b) Low reading-out rate zone capacity (LTR size) (GB)= 5.2 GB (c) High reading-out rate zone capacity (HTR size)=61.5 GB (d) Low reading-out rate (LTR) zone maximum reading-out rate (LTR max TS Rate)=108 Mbps (e) High Reading-out Rate (HTR) zone maximum reading-out rate (HTR max TS Rate)=128 Mbps Disc (4) is a disc with the following configuration.

(a) Single zone three layer disc in which disc total capacity=100 GB, and low reading-out rate (LTR) zone ratio=100%

(b) Low reading-out rate zone capacity (LTR size) (GB)= 100 GB (c) High reading-out rate zone capacity (HTR size)=0 GB (d) Low reading-out rate (LTR) zone maximum reading-out rate (LTR max TS Rate)=108 Mbps Disc (5) is a disc with the following configuration.

(a) Multi-zone three layer disc in which disc total capacity=100 GB, and low reading-out rate (LTR) zone ratio=7.8%

(b) Low reading-out rate zone capacity (LTR size) (GB)= 7.8 GB (c) High reading-out rate zone capacity (HTR size)=92.2 GB (d) Low reading-out rate (LTR) zone maximum reading-out rate (LTR max TS Rate)=108 Mbps (e) High Reading-out Rate (HTR) zone maximum reading-out rate (HTR max TS Rate)=128 Mbps In this manner, progress is being made in the standardization of the five types of disc (1) to (5) illustrated in FIG. 1 as configurations of discs for which progress is being made in the standardization as discs that support ultra high definition (UHD) images.

Description will be given of examples of a single zone disc formed of only a low reading-out rate zone (LTR zone) illustrated in (1), (2), and (4) of FIG. 1, and a multi-zone disc which has a low reading-out rate zone (LTR zone) and a high reading-out rate zone (HTR zone) illustrated in (3) and (5) of FIG. 1, with reference to FIG. 2.

FIG. 2A illustrates a configuration examples of a single zone disc formed of only a low reading-out rate zone (LTR zone) illustrated in (1), (2), and (4) of FIG. 1.

Figure 2B:
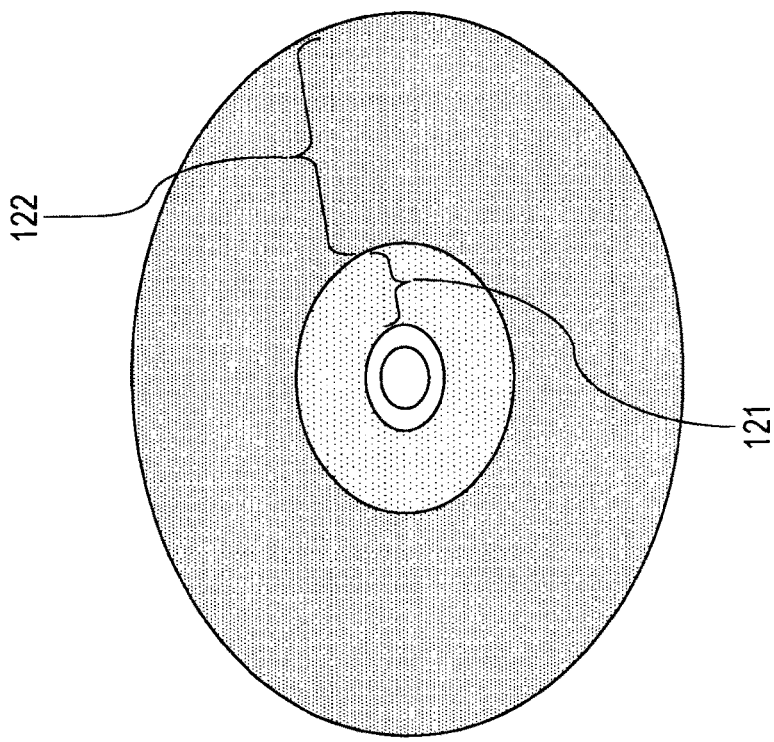

FIG. 2B illustrates a configuration example of a multi-zone disc which has a low reading-out rate zone (LTR zone) and a high reading-out rate zone (HTR zone) illustrated in (3) and (5) of FIG. 1.

In the single zone disc illustrated in FIG. 2A, the entire data recording surface of the disc is configured by a low reading-out rate zone (LTR zone) 111.

In the case of the 50 GB disc of (1) of FIG. 1, the information processing device (the reproduction device) which executes the data reproduction can perform reproduction of an ultra high definition (UHD) image by performing data reading-out of a maximum data reading-out rate=82 Mbps.

In the case of the 66.7 GB disc of (2) or the 100 GB disc of (4) of FIG. 1, the information processing device (the reproduction device) which executes the data reproduction can perform reproduction of an ultra high definition (UHD) image by performing data reading-out of a maximum data reading-out rate=108 Mbps.

The multi-zone disc illustrated in FIG. 2B is a disc in which a low reading-out rate zone (an LTR zone) 121 is set on an inner circumferential portion of the data recording surface of the disc, and a high reading-out rate zone (an HTR zone) 122 is set on the outer circumferential portion.

When the disc rotates at a fixed speed, for example, at 5000 rpm, the information processing device (the reproduction device) which executes the data reproduction can perform reading of data from a data recording region, which has a long outer circumferential portion in comparison to the inner circumferential portion of the disc. In other words, it is possible to set the reading-out rate to be high.

In the inner circumferential portion of the disc, since the length over which data reading-out is possible per unit time is short in comparison to the outer circumferential portion, the reading-out rate drops, and it becomes difficult to perform data reading-out at a high rate.

Meanwhile, in the outer circumferential portion of the disc, since the length over which data reading-out is possible per unit time is long in comparison to the inner circumferential portion, it is possible to raise the reading-out rate, and data reading-out is realized at a high rate.

This is the reason that the high reading-out rate zone (the HTR zone) is set only in the outer circumferential portion of the disc.

As in FIG. 2B, by setting the high reading-out rate region (the HTR zone) 122, it is possible to increase the total capacity of the data recording of the disc, and it is possible to record a long duration ultra high definition (UHD) image.

In the case of the 66.7 GB disc of (3) or the 100 GB disc of (5) of FIG. 1, the information processing device (the reproduction device) which executes the data reproduction executes data reading-out set such that the maximum reading-out rate is different in each zone. In other words, in the low reading-out rate zone (the LTR zone) of the inner circumferential portion of the disc, data reading-out in which the maximum reading-out rate=108 Mbps is performed.

In the high reading-out rate zone (the HTR zone) of the outer circumferential portion of the disc, data reading-out in which the maximum reading-out rate=128 Mbps is performed.

[2. Examples of Recorded Data and Reproduction Process of Disc]

In addition to data such as an image, audio, and subtitles, which is reproduction target data, various data such as reproduction control information files that are applied to the reproduction of the data, management information files, and the like is recorded on the disc.

For example, a clip AV stream file that is formed of Transport Stream (TS) packets that store data such as an image, audio, and subtitles, which is reproduction target data, is recorded on a disc which has content such as a movie recorded thereon.

Furthermore, a clip information file, which is a control file that is set corresponding to the clip VM stream file, a playlist file; and, further, a movie object file in which a reproduction program is stored, an index file in which content title information and the like is recorded; and, further, an encryption key file stored in which is a key to be applied to the decryption of the content, and various other management information files are recorded on the disc.

Description will be given of a configuration example of data that is recorded on a Blu-ray (registered trademark) Disc (BD) with reference to FIG. 3.

Figure 3:
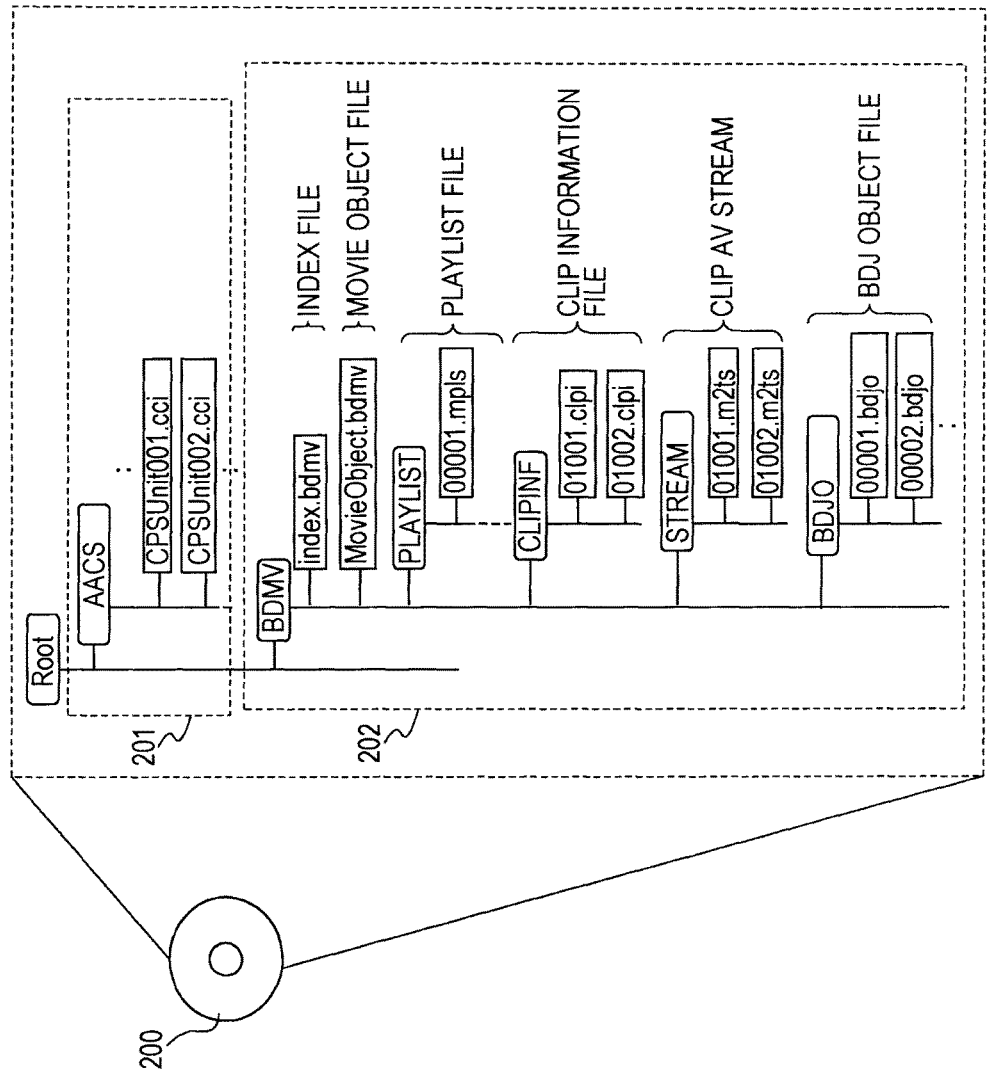
FIG. 3 is a diagram illustrating a configuration example of data that is recorded on a Blu-ray (registered trademark) Disc (BD).

FIG. 3 is a diagram illustrating the directories of recorded data according to the BDMV format that are recorded on the information recording medium (the disc) 200 as the BD-ROM, which is a ROM-type BD, for example.

As illustrated in FIG. 3, the directories are divided into a management information setting portion 201 (an AACS directory), and a data portion 202 (a BDMV directory).

A CPS unit key file, which is an encryption key of the data, a usage control information file, and the like are stored in the management information setting portion 201 (the AACS directory).

Meanwhile, for example, files such as the following:
an index file,
a movie object file,
a playlist file,
a clip information file,
a clip AV stream file, and
a BDJO file
are recorded in the BDMV directory and below of the data portion 202.

Title information, which is the index information to be applied to the reproduction process, and the like is stored in the index file.

A reproduction program that is specified according to the title is stored in the movie object file.

The playlist file is a file that defines the reproduction order and the like of content according to program information of the reproduction program that is specified according to the title, and includes information which specifies the clip information which has reproduction position information.

The clip information file is a file that is specified according to the playlist file, and includes reproduction position information of the clip AV stream file and the like.

The clip AV stream file is a file in which the AV stream data to be the reproduction target is stored.

The BDJO file is a file, stored in which is execution control information of a file in which a JAVA (registered trademark) program, commands and the like are stored.

The sequence in which the information processing device reproduces the content that is recorded on the information recording medium is as follows.

(a) First, a specific title is specified from the index file by the reproduction application.

(b) The reproduction program that is related to the specified title is selected.

(c) The playlist that defines the reproduction order and the like of the content is selected according to the program information of the selected reproduction program.

(d) According to the clip information that is defined in the selected playlist, an AV stream, which is the content actual data, or commands are read out, and reproduction of the AV stream or an execution process of the commands is performed.

Figure 4:
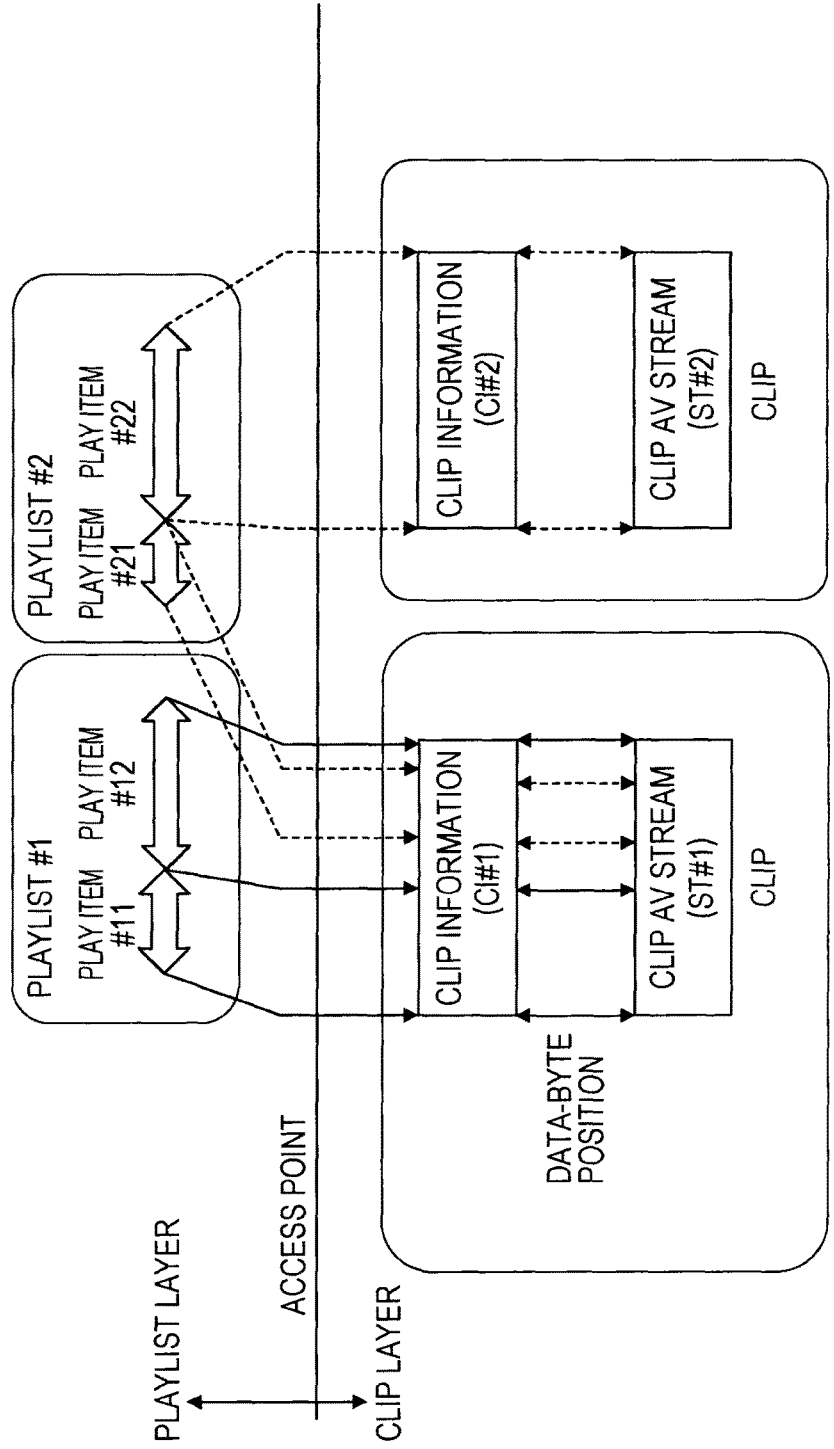
FIG. 4 is a diagram illustrating correspondence relationships and an example of a reproduction process of data recorded on an information recording medium (a disc).

FIG. 4 is a diagram illustrating the correspondence relationships of the following data that is recorded on an information recording medium (a disc) 200, that is, the data of the following:
playlist files,
clip information files, and
clip AV stream files.

The AV streams which are formed of image and audio data, which is the actual reproduction target data, are recorded as clip AV stream (Clip AV Stream) files; and, further, the playlist (PlayList) file, and the clip information (Clip Information) files are defined as the management information and reproduction control information files of the AV streams.

As illustrated in FIG. 4, these files of a plurality of categories can be divided into two layers, a playlist layer which includes the playlist (PlayList) files, and a clip layer which is formed of clip AV stream (Clip AV Stream) files, and clip information (Clip Information) files.

Note that, one clip information (Clip Information) file is associated with one clip AV stream (Clip AV Stream) file, and there is a case in which these pairs are each considered to be a single object, and are collectively referred to as a clip (Clip).

Detailed information of the data that is contained in the clip AV stream file, for example, management information such as an EP map in which the I picture position information of MPEG data is recorded, is recorded in the clip information file.

The clip AV stream (Clip AV Stream) file stores MPEG-2 Transport Stream (TS) as data that is arranged according to the defined structure of the BDMV format.

Management information for acquiring a reproduction start position of the stored data of the clip AV stream file such as a data position of byte string data of the clip AV stream file, and the data corresponding to the reproduction time position such as (entry point: EP) which is the reproduction start point when expanding on a time axis is stored in the clip information (Clip Information) file.

For example, when a time stamp indicating a reproduction time elapsed position from the start point of the content is provided, it becomes possible to acquire the data reading-out position of the clip AV stream file, that is, the address as the reproduction start point, with reference to the clip information file.

The playlist (PlayList) file includes information which specifies a reproduction section in relation to the reproducible data that is included in the clip (=clip information file+clip AV stream file).

One or more play items (PlayItem) are set in the playlist (PlayList) file, and each of the play items includes information which specifies a reproduction section in relation to the reproducible data that is included in the clip (=clip information file+clip AV stream file).

Note that, the clip AV stream (Clip AV Stream) file in which the image and the audio to be the reproduction target are stored has an MPEG-2 transport stream (TS) file structure.

[3. Examples of Data Recording Configuration and Reproduction Process of Disc with Multi-Layer (Layer) Structure]

The discs of (1) to (5) illustrated in FIG. 1 that is described earlier are all multi-layer (layer) structure discs of two layers or three layers.

In such a multi-layer disc, it is possible to record long duration content such as single movie content, for example, sequentially to the plurality of layers. When reproducing content that is recorded across plural layers, it is necessary for the reproduction device to perform a jump to a different layer during the playback, that is, to perform an inter-layer jump.

Description will be given of a recording configuration and an example of a reproduction process of data using a disc with a three-layer structure, with reference to FIGS. 5A and 5B onward.

FIG. 5A is a diagram illustrating the cross-sectional structure of the 100 GB multi-zone three layer disc of (5) illustrated in FIG. 1.

The disc is configured of three layers, from the top, a first layer, a second layer, and a third layer.

The 100 GB disc with the three layer structure illustrated in FIG. 5A is the multi-zone three layer disc illustrated in (5) of FIG. 1 and has the following configuration.

(a) Multi-zone three layer disc in which disc total capacity=100 GB, and low reading-out rate (LTR) zone ratio=7.8%

(b) Low reading-out rate zone capacity (LTR size) (GB)= 7.8 GB (c) High reading-out rate zone capacity (HTR size)=92.2 GB (d) Low reading-out rate (LTR) zone maximum reading-out rate (LTR max TS Rate)=108 Mbps (e) High Reading-out Rate (HTR) zone maximum reading-out rate (HTR max TS Rate)=128 Mbps As illustrated in FIG. 5A, each of the three layers includes the low reading-out rate zone 121 in the inner circumferential portion of the disc, and the high reading-out rate zone 122 in the outer circumferential portion.

Description will be given of the processes in a case in which the content of a single movie or the like is recorded on a three layer disc in which different reading-out rate zones are set, and the content is reproduced.

Note that, it is possible adopt various settings as the recording method of the content. The example illustrated in FIGS. 5A and 5B are examples in which the reproduction data is recorded across a plurality of layers (layers) using the entirety of the disc from the inner circumference to the outer circumference, without considering the boundary of the reading-out rate zones.

Note that, the reproduction data is the data such as the image, the audio, and the subtitles that are stored in the clip AV stream file that is described with reference to FIGS. 3 and 4.

When the reproduction data is recorded with such settings, the data reading-out order of the reproduction data is the logical sector setting order illustrated in FIG. 5B.

It becomes necessary for the reproduction device to execute reproduction by alternately reading out zones of different reading-out rates as illustrated in FIG. 5B.

In FIG. 5B, the data is lined up in logical sector (Logical Sector) order from left to right, and the reproduction process is execute in the logical sector order.

When the settings illustrated in FIGS. 5A and 5B are adopted, the reproduction device has to execute the data reading-out alternately from zones with different reading-out rates, and when the reading-out rate changes, it is necessary to switch the data processing algorithm.

There is a case in which switching the data processing is a burden on the reproduction device.

Description will be given of the data recording and reproduction process examples for not causing the data processing to be switched, with reference to FIGS. 6A and 6B.

Similarly to FIG. 5A, FIG. 6A is a diagram illustrating the cross-sectional structure of the 100 GB multi-zone three layer disc of (5) illustrated in FIG. 1.

The disc is configured of three layers, from the top, a first layer, a second layer, and a third layer.

The disc is one in which, on each layer, the low reading-out rate zone 121 is formed in the inner circumferential portion of the disc, and the high reading-out rate zone 122 is formed in the outer circumferential portion.

Each of the three layers illustrated in FIG. 6A includes the low reading-out rate zone 121 in the inner circumferential portion of the disc, and the high reading-out rate zone 122 in the outer circumferential portion.

Description will be given of the processes in a case in which the content of a single movie or the like is recorded on a three layer disc in which different reading-out rate zones are set, and the content is reproduced.

The example illustrated in FIGS. 6A and 6B illustrates an example in which a single item of content, for example, data for reproduction such as a movie, is recorded using only the high reading-out rate zone 122.

Data files for which sequential reading-out is necessary, such as clip AV stream files, are recorded in the high reading-out rate zone 122, and encryption key files, index files, management data files, and the like are recorded in the low reading-out rate zone 121.

When the reproduction data is recorded across a plurality of layers (layers) using only the high reading-out rate zone 122, the reading-out order of the reproduction data assumes the logical sector setting order illustrated in FIG. 6B.

The reproduction device can execute the reproduction by reading out the data from only the high reading-out rate zone 122, as illustrated in FIG. 6B.

In the configuration illustrated in FIGS. 6A and 6B, the reproduction device may execute the data reading-out from the high reading-out rate zone 122, and it is not necessary to execute the data reading-out alternately from zones with different reading-out rates as in the example described with reference to FIG. 5B. Therefore, in the data reading-out of a single item of content, it is not necessary to switch the data processing algorithm.

Note that, the division of the recorded data in relation to the high reading-out rate zone 122 and the low reading-out rate zone 121 can be set as follows, for example.

The clip AV stream files and the clip information files to be the reproduction targets are recorded in the high reading-out rate zone 122. Other management information files and database files such as index files, movie object files, and playlist files are recorded in the low reading-out rate zone 121.

By adopting these settings, when performing a reading-out process of clip information files and clip AV stream files for which sequential reading-out is necessary, it is no longer necessary to perform the switching of the processing algorithm.

Alternatively, settings may be adopted in which the main part of the movie content is recorded to the high reading-out rate zone 122, and bonus content and the like other than the main part is recorded to the low reading-out rate zone 121.

Figure 7A:
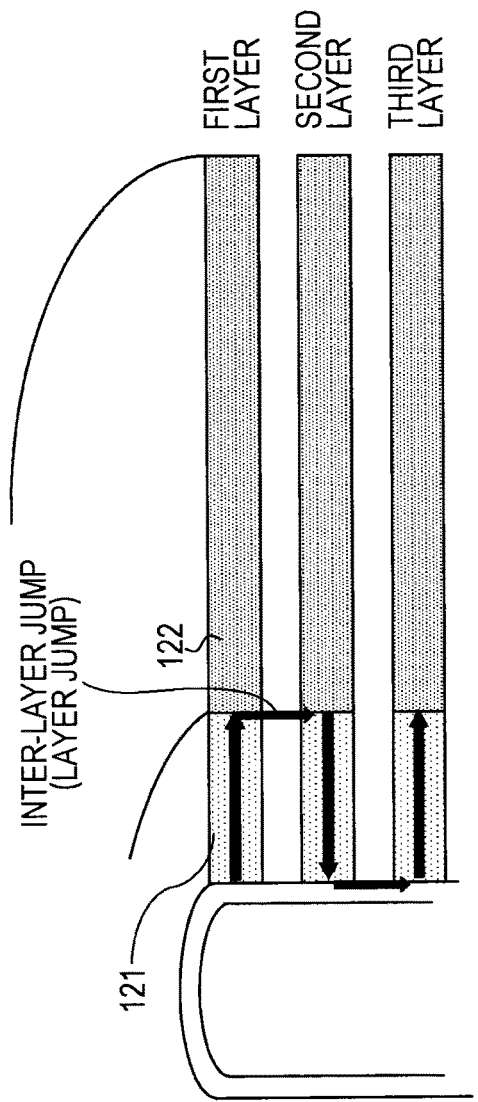
FIGS. 7A and 7B are diagrams illustrating a recording configuration and an example of a reproduction process of data using a disc with a three-layer structure.
Figure 7B:
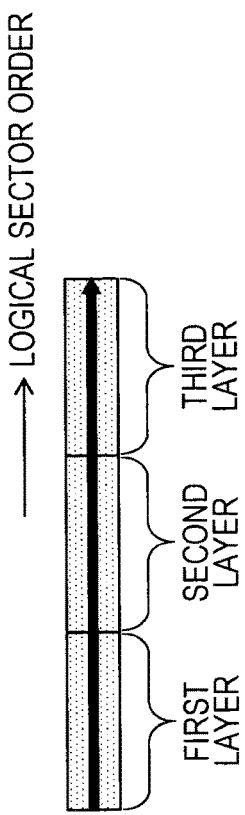

FIGS. 7A and 7B are diagrams illustrating a recording configuration and an example of a reproduction process of data using only the low reading-out rate zone 121.

The example illustrated in FIGS. 7A and 7B illustrates a data reading-out process example that uses only the low reading-out rate zone 121. Database files corresponding to the clip information files and the clip AV stream files that are recorded in the high reading-out rate zone 121, for example, are recorded in the low reading-out rate zone 121.

The database files make it possible to execute the reading-out process before starting reproduction, read out the data that is expanded to the memory, for example, the RAM or the like of the reproduction device, and perform a process by referring to the expanded data in the RAM during reproduction.

The reading-out order of the data that is recorded across a plurality of layers (layers) using only the low reading-out rate zone 121 assumes the logical sector setting order illustrated in FIG. 7B.

The reproduction device reads out the data, for example, the database file data from only the low reading-out rate zone 121, as illustrated in FIG. 7B.

In the configuration illustrated in FIGS. 7A and 7B, the reproduction device may execute the data reading-out from the low reading-out rate zone 121, and it is not necessary to execute the data reading-out alternately from zones with different reading-out rates. Therefore, in the data reading-out, it is not necessary to switch the data processing algorithm.

[4. Example in which Disc Type Information Indicating Disc Configuration of Disc is Recorded]

As described with reference to FIG. 1 and others, progress is being made in the standardization of a plurality of different types of disc as Blu-ray (registered trademark) Disc (BD) which are discs that support ultra high definition (UHD) images.

As described earlier, there is a likelihood that the two different types of disc below will be used.

(A) A multi-zone set disc in which data recording regions of different reading-out rates are set in an outer circumferential region and an inner circumferential region of the disc (B) A single zone set disc in which data recording regions of a single reading-out rate are set in all regions of the disc Furthermore, the total capacity of the disc, and the number of layers (layers) also have various settings, and there is a high likelihood that at least the five types of disc illustrated in FIG. 1 will be used. In the future, there is a likelihood that discs with a configuration other than those of the five types illustrated in FIG. 1 will be used.

Hereinafter, description will be given of a configuration for correctly executing the reproduction process of data, the recording process, and the disc manufacturing process according to each type of disc when various types of disc are used.

As described with reference to FIG. 3 and the like, when reproducing the content that is recorded on the information recording medium, the reproduction device first acquires the index files using the reproduction application, and selects the title to be the reproduction target from the index files.

In other words, the reproduction device first performs a process in which the reproduction device acquires the index files and reads the information that is recorded in the index files.

A configuration example of data of an index table, which is the recorded data in the index files that are recorded on the information recording medium (the disc) 200 of the present disclosure is illustrated in FIGS. 8A and 8B.

FIGS. 8A and 8B are diagrams illustrating a portion of the recorded data in the index table that is recorded on the information recording medium (the disc) of the present disclosure.

The following data is recorded in the index table.

(a) Data length [length]

(b) Type information of reproduction start data (3D image or 2D image) [initial_out_mode_preference]

(c) Information indicating presence or absence of 3D image data in disc [SS_content_exist_flag]

(d) Disc type information [physical_disc_info]

Note that, in the data illustrated in FIGS. 8A and 8B, only a portion of the data that is recorded in the index table is shown, and various data is recorded in the index table in addition to the data illustrated in FIGS. 8A and 8B.

In the index table recorded data illustrated in FIGS. 8A and 8B, the data:

(d) Disc type information [physical_disc_info] is the data that is newly added in the present disclosure.

As illustrated in the specific example of the disc type information of FIG. 8A, a value that indicates the type of the disc in which the index table is recorded is set in the disc type information.

Specifically, for example, a recorded value indicating one of the following disc types is recorded.

(a) Recorded value=0: total recording capacity=50 GB single zone two layer disc ((1) of FIG. 1)

(b) Recorded value=1: total recording capacity=66.7 GB single zone two layer disc ((2) of FIG. 1)

(c) Recorded value=2: total recording capacity=66.7 GB multi-zone two layer disc ((3) of FIG. 1)

(d) Recorded value=3: total recording capacity=100 GB single zone three layer disc ((4) of FIG. 1)

(e) Recorded value=4: total recording capacity=100 GB multi-zone three layer disc ((5) of FIG. 1)

In this manner, the disc type information indicating the type and configuration of the disc is recorded in the index table.

The reproduction device that executes the reproduction of the disc recorded content first reads the index table, and acquires the set value of the disc type information described above that is recorded in the index table.

It is possible for the reproduction device to ascertain the disc configuration according to the set value indicating the disc type that is recorded in the index table, and it is possible for the reproduction device to determine the data processing mode that is necessary during content reproduction in advance and accurately execute the reproduction process according to the disc type.

The following effects can be obtained by recording the disc type in the index table.

The reproduction device can determine what degree of data rate of file is recorded on the outer circumference of the disc according to the disc type information that is recorded in the index table. According to the determined result, it is possible to control the rotation frequency of the disc to the necessary level. In other words, it is possible to lower the rotation frequency to the lowest necessary rotation frequency and execute data reading-out, and according to this control, it becomes possible to reduce noise, to reduce the load on the drive, and to reduce the power consumption based on the disc rotation.

In this manner, the data processing unit of the reproduction device which executes the data reproduction from the disc reads the disc type information that is recorded on the disc, ascertains the recorded data configuration of the disc based on the disc type information that is read, and executes the data reading-out and the reproduction processes according to the reading-out rate corresponding to the ascertained recorded data configuration.

As described earlier, the disc type information includes zone setting information and total recording capacity information which enables the determination of whether the disc is a single zone disc formed of a single reading-out rate zone, or whether the disc is a multi-zone disc formed of a plurality of different reading-out rate zones.

The data processing unit of the reproduction device applies the algorithm that is determined by applying the information, and executes the data reading-out and reproduction processes.

Specifically, when the disc is a single zone disc formed of a single reading-out rate zone, the data reading-out and reproduction processes are executed in relation to all regions of the disc using the same algorithm.

When the disc is a multi-zone disc formed of a plurality of different reading-out rate zones, a different algorithm is applied for each zone unit of the disc, and the data reading-out and reproduction processes are executed.

Note that, the disc type information that is recorded in the index table is also beneficial when performing the manufacture of the recording disc of the content.

A content creation studio creates the content itself. The content creation studio creates content with various settings.

Specifically, content that can be recorded using only the low reading-out rate zone, content in which it is necessary to record using two zones, the low reading-out rate zone, and the high reading-out rate zone.

The content creation studio determines which of the modes of FIG. 1 (1) to (5) recording should be performed in according to the content, records the information in advance as the disc type information of the index table that is described with reference to FIGS. 8A and 8B, and provides the information to the disc factory.

It becomes possible for the disc factory to determine the disc type of the disc onto which the content will be recorded by referencing the index table included in the data that is received from the content creation studio.

The disc factory can determine the content recording mode in relation to the disc according to the determination results and perform the recording.

During reproduction tests and the like of the recorded data, it becomes possible to ascertain the configuration of the recorded data by referring to the disc type information of the index table, and it becomes possible to accurately perform the reproduction tests of the recorded data.

Specifically, the data processing unit that executes the data processing in the disc manufacturing device reads the disc type information included in the disc recording information, determines the data recording mode in relation to the disc based on the read disc type information, and executes the data recording process in relation to the disc.

Furthermore, during the recorded data reproduction test of the manufactured disc, the data processing unit reads the disc type information of the index table that is recorded on the disc, and executes the recorded data reproduction test according to an algorithm that is determined according to the read disc type information.

Next, description will be given of the specific sequence of processes using the disc type information of the index table that is described with reference to FIGS. 8A and 8B, with reference to the flowchart illustrated in FIGS. 9 and 10.

FIG. 9 is a flowchart that shows the sequence of processes executed by the information processing device (the reproduction device) that reproduces the content that is recorded on the disc.

FIG. 10 a flowchart that shows the sequence of processes executed in a disc manufacturing device.

First, description will be given of the sequence of processes executed by the information processing device (the reproduction device) that reproduces the content that is recorded on the disc, with reference to the flowchart illustrated in FIG. 9.

The flow illustrated in FIG. 9 is executed under the control of the data processing unit provided with a CPU which has a function of executing the program of the reproduction device. The program to be the execution target is a program (a reproduction program) that is stored in a storage unit of the reproduction device in advance, or is a program (a reproduction application) that is recorded on a disc.

Hereinafter, description will be given of the processes of each step of the flow illustrated in FIG. 9.

(Step S101)

First, in step S101, the reproduction device reads the index table that is recorded together with the content from the disc on which the reproduction target content is stored.

Data according to the directories described with reference to FIG. 3 earlier, for example, is recorded on the disc. The index table including the disc type information described with reference to FIGS. 8A and 8B is recorded on the disc.

In addition to the clip AV stream files to be the reproduction targets, clip information files, playlist files, movie object files, index files, and the like are recorded on the disc.

First, the reproduction device reads the index files, and reads the index tables that are stored in the index files.

The index table, as described earlier with reference to FIGS. 8A and 8B, is a table in which the disc type information is recorded.

Information indicating the content recording mode that is recorded on the disc, specifically, for example, indicating which data recording configuration the disc has of (1) to (5) that are described earlier with reference to FIG. 1 is recorded in the disc type information.

(Step S102)

In step S102, the reproduction device reads the disc type information that is recorded in the index table that is read from the disc.

For example, the reproduction device reads the information indicating which of FIG. 1 (1) to (5) the disc is.

(Step S103)

In step S103, the reproduction device determines the data reading-out mode and the reproduction mode according to the maximum data reading-out rate of each region of the disc determined based on the disc type information that is acquired in step S102. The reproduction device executes the data reading-out and reproduction processes according to the determined mode.

For example, the processes of a case in which the disc type information is set as shown in FIG. 8A are the following processes.

(a) Case in which disc type information=0 (50 GB single zone two layer disc)

In this case, the reproduction device determines that the disc is formed of only the low reading-out rate zone, and executes data reading-out and reproduction processes uniformly at the low reading-out rate.

(b) Case in which disc type information=1 (66.7 GB single zone two layer disc)

In this case, the reproduction device determines that the disc is formed of only the low reading-out rate zone, and executes data reading-out and reproduction processes uniformly at the low reading-out rate.

(c) Case in which disc type information=2 (66.7 GB multi-zone two layer disc)

In this case, the reproduction device determines that the disc is formed of a plurality of zones, the low reading-out rate zone and the high reading-out rate zone, and executes data reading-out and reproduction processes, switching between a process that supports the high reading-out rate and a process that supports the low reading-out rate.

(d) Case in which disc type information=3 (100 GB single zone three layer disc)

In this case, the reproduction device determines that the disc is formed of only the low reading-out rate zone, and executes data reading-out and reproduction processes uniformly at the low reading-out rate.

(e) Case in which disc type information=4 (100 GB multi-zone three layer disc)

In this case, the reproduction device determines that the disc is formed of a plurality of zones, the low reading-out rate zone and the high reading-out rate zone, and executes data reading-out and reproduction processes, switching between a process that supports the high reading-out rate and a process that supports the low reading-out rate.

Next description will be given of the sequence of processes executed in a disc manufacturing device, with reference to the flowchart illustrated in FIG. 10.

The flow illustrated in FIG. 10 is executed under the control of the data processing unit provided with a CPU which has a function of executing the program of the disc manufacturing device. The program to be the execution target is a program (a reproduction program) that is stored in a storage unit of the disc manufacturing device in advance.

Hereinafter, description will be given of the processes of each step of the flow illustrated in FIG. 10.

(Step S201)

In step S201, first, the disc manufacturing device reads the index table included in the data for disc recording that is received from the content creation studio, for example.

Note that, the data for disc recording is recorded on a medium such as flash memory, for example, and acquired from the content creation studio. Alternatively, various settings are possible such as receiving the data for disc recording via a data communication unit.

Data according to the directories described with reference to FIG. 3 earlier, for example, is included in the data for disc recording.

In addition to the clip AV stream files to be the reproduction targets, clip information files, playlist files, movie object files, index files, and the like are included in the data for disc recording.

The disc manufacturing device reads the index files from the data for disc recording, and reads the index tables that are stored in the index files.

The index table, as described earlier with reference to FIGS. 8A and 8B, is a table in which the disc type information is recorded.

Information indicating the content recording mode that is recorded on the disc, specifically, for example, indicating which data recording configuration the disc has of (1) to (5) that are described earlier with reference to FIG. 1 is recorded in the disc type information.

(Step S202)

In step S202, the disc manufacturing device reads the disc type information that is recorded in the index table that is read from the data for disc recording.

For example, the reproduction device reads the information indicating which of FIG. 1 (1) to (5) the disc is.

(Step S203)

In step S203, the disc manufacturing device executes the data recording process and the reproduction test of the recorded data and the like according to the maximum data reading-out rate of each region of the disc determined based on the disc type information that is acquired in step S202.

For example, the processes of a case in which the disc type information is set as shown in FIG. 8A are the following processes.

(a) Case in which disc type information=0 (50 GB single zone two layer disc)

In this case, the disc manufacturing device manufactures a disc formed of only the low reading-out rate zone. In the reproduction test after the disc manufacture, the data reading-out and reproduction processes are executed uniformly at the low reading-out rate.

(b) Case in which disc type information=1 (66.7 GB single zone two layer disc)

In this case, the disc manufacturing device manufactures a disc formed of only the low reading-out rate zone. In the reproduction test after the disc manufacture, the data reading-out and reproduction processes are executed uniformly at the low reading-out rate.

(c) Case in which disc type information=2 (66.7 GB multi-zone two layer disc)

In this case, the disc manufacturing device manufactures a disc formed of a plurality of zones, the low reading-out rate zone and the high reading-out rate zone. In the reproduction test after the disc manufacture, the data reading-out and reproduction processes are executed, switching between a process that supports the high reading-out rate and a process that supports the low reading-out rate.

(d) Case in which disc type information=3 (100 GB single zone three layer disc)

In this case, the disc manufacturing device manufactures a disc formed of only the low reading-out rate zone. In the reproduction test after the disc manufacture, the data reading-out and reproduction processes are executed uniformly at the low reading-out rate.

(e) Case in which disc type information=4 (100 GB multi-zone three layer disc)

In this case, the disc manufacturing device manufactures a disc formed of a plurality of zones, the low reading-out rate zone and the high reading-out rate zone. In the reproduction test after the disc manufacture, the data reading-out and reproduction processes are executed, switching between a process that supports the high reading-out rate and a process that supports the low reading-out rate.

[5. Configuration Example of Information Processing Device]

Next description will be given of a configuration example of the hardware of the information processing device which can be applied as the reproduction device, the recording device, or the information recording medium manufacturing device of the disc, with reference to FIG. 11.

A CPU (Central Processing Unit) 301 functions as a data processing unit that executes the various processes according to a program which is stored in ROM (Read Only Memory) 302 or a storage unit 308. For example, the CPU 301 executes processes according to the sequences described above in the examples. The program executed by the CPU 301, data, and the like are stored in RAM (Random Access Memory) 303. The CPU 301, the ROM 302, and the RAM 303 are connected to each other by a bus 304.

The CPU 301 is connected to an input-output interface 305 via the bus 304, and an input unit 306 which is formed of various switches, a keyboard, a mouse, a microphone, or the like, and an output unit 307 which is formed of a display, a speaker, or the like are connected to the input-output interface 305. The CPU 301 executes various processes according to commands that are input from the input unit 306, and outputs the process results to the output unit 307, for example.

The storage unit 308 which is connected to the input-output interface 305 is formed of a hard disk or the like, for example, and stores the programs that are executed by the CPU 301, and various data. A communication unit 309 functions as a transceiver of data communication via a network such as the Internet, or a local area network, further functions as a transceiver of broadcast waves, and communicates with external devices.

A drive 310 which is connected to the input-output interface 305 drives a removable medium 311 such as a magnetic disk, an optical disc, a magneto-optical disc, or semiconductor memory such as a memory card, and executes the recording or reading of the data.

Note that, the encoding or the decoding of the data can be executed as processes of the CPU 301, which is the data processing unit. However, a configuration provided with a codec as dedicated hardware for executing the encoding process or the decoding process may be adopted.

[6. Summary of Configuration of Present Disclosure]

In the above, a detailed explanation is given of the embodiments of the present disclosure while giving reference to specific embodiments. However, it is obvious that a person skilled in the art can amend and modify the examples within the scope of the main concept of the present disclosure. In other words, the present disclosure is disclosed as modes that are examples, and thus should not be interpreted as limiting. In order to determine the main concept of the present disclosure, it is preferable to refer to the Claims.

Furthermore, the technology disclosed in the present specification can adopt the following configurations.

(1) An information processing device including a data processing unit which executes a reproduction process of recorded data of a disc, in which the data processing unit reads disc type information that is recorded on the disc, and ascertains a recorded data configuration of the disc based on the disc type information that is read, and executes data reading-out and reproduction processes according to a reading-out rate corresponding to the ascertained recorded data configuration.

(2) The information processing device according to (1), in which the disc type information includes zone setting information that enables determination of whether the disc is a single zone disc formed of a single reading-out rate zone, or whether the disc is a multi-zone disc formed of a plurality of different reading-out rate zones, and in which the data processing unit executes the data reading-out and reproduction processes in relation to all regions of the disc using the same algorithm when the disc is the single zone disc formed of the single reading-out rate zone, and executes the data reading-out and reproduction processes by applying a different algorithm for each zone unit of the disc when the disc is the multi-zone disc formed of the plurality of different reading-out rate zones.

(3) The information processing device according to (2), in which the disc type information further includes total recording capacity information of the disc, and in which the data processing unit executes the data reading-out and reproduction processes by applying the algorithm that is determined based on the zone setting information and the total recording capacity of the disc.

(4) The information processing device according to any one of (1) to (3), in which the disc type information is recorded in an index table that is recorded on the disc, and in which the data processing unit reads the disc type information from the index table that is recorded on the disc.

(5) The information processing device according to any of (1) to (4), in which the data processing unit controls a disc rotation frequency according to the disc rotation frequency that is necessary and is calculated based on the disc type information.

(6) An information processing device, includes a data processing unit which executes data processing in a disc manufacturing process, in which the data processing unit reads disc type information that is included in recorded data in relation to a manufactured disc, and determines a data recording mode of the disc based on the read disc type information, and executes a data recording process in relation to the disc.

(7) The information processing device according to (6), in which during a recorded data reproduction test of the manufactured disc, the data processing unit reads disc type information of an index table that is recorded on the disc, and executes the recorded data reproduction test according to an algorithm that is determined according to the read disc type information.

(8) The information processing device according to (7), in which the disc type information includes zone setting information that enables determination of whether the disc is a single zone disc formed of a single reading-out rate zone, or whether the disc is a multi-zone disc formed of a plurality of different reading-out rate zones, and in which the data processing unit executes the data reproduction test in relation to all regions of the disc using the same algorithm when the disc is the single zone disc formed of the single reading-out rate zone, and executes the data reproduction test by applying a different algorithm for each zone unit of the disc when the disc is the multi-zone disc formed of the plurality of different reading-out rate zones.

(9) An information recording medium, in which, as recorded data, the information recording medium stores reproduction target data, and management data corresponding to the reproduction target data, in which the management data includes disc type information that includes zone setting information enables determination of whether a disc is a single zone disc formed of a single reading-out rate zone, or a multi-zone disc formed of a plurality of different reading-out rate zones, and in which the information recording medium makes it possible for a reproduction device that executes a reproduction process of data from the disc to refer to the disc type information and determine whether the disc is the single zone disc or the multi-zone disc.

(10) The information recording medium according to (9), in which the disc type information is recorded in an index table that is recorded on the disc.

(11) An information processing method which is executed in an information processing device, in which the information processing device includes a data processing unit which executes a reproduction process of recorded data of a disc, and in which the data processing unit reads disc type information that is recorded on the disc, and ascertains a recorded data configuration of the disc based on the disc type information that is read, and executes data reading-out and reproduction processes according to a reading-out rate corresponding to the ascertained recorded data configuration.

(12) An information processing method that is executed in an information processing device, in which the information processing device includes a data processing unit which executes data processing in a disc manufacturing process, and in which the data processing unit reads disc type information that is included in recorded data in relation to a manufactured disc, and determines a data recording mode of the disc based on the read disc type information, and executes a data recording process in relation to the disc.

(13) A program which causes an information processing device to execute information processing, in which the information processing device includes a data processing unit which executes a reproduction process of recorded data of a disc, and in which the program causes the data processing unit to execute a process of reading disc type information that is recorded on the disc, and to ascertain a recorded data configuration of the disc based on the disc type information that is read, and to execute data reading-out and reproduction processes according to a reading-out rate corresponding to the ascertained recorded data configuration.

(14) A program which causes an information processing device to execute information processing, in which the information processing device includes a data processing unit which executes data processing in a disc manufacturing process, and in which the program causes the data processing unit to execute a process of reading disc type information that is included in recorded data in relation to a manufactured disc, and to determine a data recording mode of the disc and to execute a data recording process in relation to the disc based on the read disc type information.

It is possible to execute the series of processes which are described in the specification using hardware, software, or the combined configuration of both of these. When executing the processes using software, it is possible to either install a program, to which the process sequence is recorded, into the memory inside a computer, which is built into dedicated hardware, and execute the program, or, to install a program into a generic computer, which is able to execute the various processes, and execute the program. For example, the program may be recorded onto the recording medium in advance. Besides installing the program to a computer from a recording medium, the program may be received via a network such as a Local Area Network (LAN) or the Internet, and installed to a recording medium such as an internal hard disk.

Note that, various processes described in the specification may be not only executed in time series according to the description, but also may be executed in parallel or individually according to the performance of the device executing the processes, or as necessary. The term "system" in the present specification refers to a logical group configuration of a plurality of devices, and the devices of the configurations are not limited to being within the same housing.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device, comprising:
circuitry configured to:
execute a reproduction process of recorded data of a disc;
read disc type information that is recorded on the disc, the disc type information indicating a recording capacity; and
execute data reading-out and reproduction processes based on the disc type information, wherein
when the disc type information includes a first value, the circuitry is configured to determine that the first value indicates that the recording capacity is equal to a first data capacity and the disc has a first maximum read-out rate, and
when the disc type information includes a second value, the circuitry is configured to determine that the second value indicates that the recording capacity is equal to the first data capacity and the disc has the first maximum read-out rate for a low read-out rate zone and a second maximum read-out rate for a high read-out rate zone.

2. The information processing device according to claim 1, wherein the circuitry is further configured to
determine, based on the disc type information, whether the disc is a single zone disc formed of a single reading-out rate zone or whether the disc is a plural zone disc formed of a plurality of different reading-out rate zones;
execute the data reading-out and reproduction processes in relation to all regions of the disc using a same algorithm when the disc is the single zone disc formed of the single reading-out rate zone; and
execute the data reading-out and reproduction processes by applying a different algorithm for each zone of the disc when the disc is the plural zone disc formed of the plurality of different reading-out rate zones.

3. The information processing device according to claim 2, wherein the circuitry is further configured to execute the data reading-out and reproduction processes by applying an algorithm that is determined based on the disc type information and a total recording capacity.

4. The information processing device according to claim 1, wherein
the disc type information is recorded in an index table that is recorded on the disc, and
the circuitry is further configured to read the disc type information from the index table that is recorded on the disc.

5. The information processing device according to claim 1, wherein the circuitry is further configured to control a disc rotation frequency according to the disc rotation frequency that is necessary and is calculated based on the disc type information.

6. An information processing device, comprising:
circuitry configured to:
execute a data processing in a disc manufacturing process;
read disc type information that is included in recorded data in relation to a manufactured disc, the disc type information indicating a recording capacity of the manufactured disc; and
execute a data recording process in relation to the manufactured disc based on the disc type information, wherein
when the disc type information includes a first value, the circuitry is configured to determine that the first value indicates that the recording capacity is equal to a first data capacity and the manufactured disc has a first maximum read-out rate, and
when the disc type information includes a second value, the circuitry is configured to determine that the second value indicates that the recording capacity is equal to the first data capacity and the manufactured disc has the first maximum read-out rate for a low read-out rate zone and a second maximum read-out rate for a high read-out rate zone.

7. The information processing device according to claim 6, wherein during a recorded data reproduction test of the manufactured disc, the circuitry is configured to read the disc type information of an index table that is recorded on the manufactured disc, and execute the recorded data reproduction test according to an algorithm that is determined according to the read disc type information.

8. The information processing device according to claim 7, wherein the circuitry is further configured to
determine, based on the disc type information, whether the manufactured disc is a single zone disc formed of a single reading-out rate zone or whether the manufactured disc is a plural zone disc formed of a plurality of different reading-out rate zones;
execute the data reproduction test in relation to all regions of the manufactured disc using a same algorithm when the manufactured disc is the single zone disc formed of the single reading-out rate zone; and
execute the data reproduction test by applying a different algorithm for each zone unit of the manufactured disc when the manufactured disc is the plural zone disc formed of the plurality of different reading-out rate zones.

9. An information processing method, comprising:
executing a reproduction process of recorded data of a disc;
reading, by circuitry of an information processing device, disc type information that is recorded on the disc, the disc type information indicating a recording capacity;
determining, when the disc type information includes a first value, that the first value indicates that the recording capacity is equal to a first data capacity and the disc has a first maximum read-out rate;
determining, when the disc type information includes a second value, that the second value indicates that the recording capacity is equal to the first data capacity and the disc has the first maximum read-out rate for a low read-out rate zone and a second maximum read-out rate for a high read-out rate zone; and
executing data reading-out and reproduction processes based on the disc type information.

10. An information processing method, comprising:
executing data processing in a disc manufacturing process;
reading, by circuitry of an information processing device, disc type information that is included in recorded data in relation to a manufactured disc, the disc type information indicating a recording capacity of the manufactured disc;
executing a data recording process in relation to the manufactured disc based on the disc type information;
determining, when the disc type information includes a first value, that the first value indicates that the recording capacity is equal to a first data capacity and the manufactured disc has a first maximum read-out rate; and determining, when the disc type information includes a second value, that the second value indicates that the recording capacity is equal to the first data capacity and the manufactured disc has the first maximum read-out rate for a low read-out rate zone and a second maximum read-out rate for a high read-out rate zone.

11. A non-transitory computer readable medium storing computer executable instructions that, when executed by circuitry of an information processing device, cause the circuitry to perform a method comprising:

executing a reproduction process of recorded data of a disc;

reading disc type information that is recorded on the disc, the disc type information indicating a recording capacity;

executing data reading-out and reproduction processes based on the disc type information;

determining, when the disc type information includes a first value, that the first value indicates that the recording capacity is equal to a first data capacity and the disc has a first maximum read-out rate; and determining, when the disc type information includes a second value, that the second value indicates that the recording capacity is equal to the first data capacity and the disc has the first maximum read-out rate for a low read-out rate zone and a second maximum read-out rate for a high read-out rate zone.

12. A non-transitory computer readable medium storing computer executable instructions that, when executed by circuitry of an information processing device, cause the circuitry to perform a method comprising:

executing data processing in a disc manufacturing process;

reading disc type information that is included in recorded data in relation to a manufactured disc, the disc type information indicating a recording capacity of the manufactured disc;

executing a data recording process in relation to the manufactured disc based on the disc type information;

determining, when the disc type information includes a first value, that the first value indicates that the recording capacity is equal to a first data capacity and the manufactured disc has a first maximum read-out rate; and determining, when the disc type information includes a second value, that the second value indicates that the recording capacity is equal to the first data capacity and the manufactured disc has the first maximum read-out rate for a low read-out rate zone and a second maximum read-out rate for a high read-out rate zone.

13. The information processing device according to claim 1, wherein when the disc type information includes a third value, the circuitry is configured to determine that the third value indicates that the disc is a single zone three layer disc.

14. The information processing device according to claim 1, wherein the first and second values further indicate the recording capacity.

15. The information processing method according to claim 9, further comprising:

determining, when the disc type information includes a third value, that the third value indicates that the disc is a single zone three layer disc.

16. The information processing device according to claim 9, wherein the first and second values further indicate the recording capacity.

17. The non-transitory computer readable medium according to claim 11, wherein the method further comprises:

determining, when the disc type information includes a third value, that the third value indicates that the disc is a single zone three layer disc.

18. The non-transitory computer readable medium according to claim 11, wherein the first and second values further indicate the recording capacity.

19. A non-transitory computer readable medium, comprising:

a memory that stores recorded data and management data, wherein the management data includes disc type information that includes a recording capacity, and when an information processing device executes data reading-out and reproduction processes of the recorded data in the memory based on the disc type information, the information processing device is configured to determine, when the disc type information includes a first value, that the first value indicates that the recording capacity is equal to a first data capacity and the memory has a first maximum read-out rate, and determine, when the disc type information includes a second value, that the second value indicates that the recording capacity is equal to the first data capacity and the memory has the first maximum read-out rate for a low read-out rate zone and a second maximum read-out rate for a high read-out rate zone.

* * * * *